United States Patent [19]

Norback

[11] Patent Number: 4,708,832
[45] Date of Patent: Nov. 24, 1987

[54] CONTACT BODY

[75] Inventor: Per G. Norback, Lidingo, Sweden

[73] Assignee: Aktiebolaget Carl Munters, Sollentuna, Sweden

[21] Appl. No.: 888,641

[22] Filed: Jul. 28, 1986

Related U.S. Application Data

[63] Continuation of Ser. No. 698,604, Feb. 6, 1985, abandoned.

[30] Foreign Application Priority Data

Feb. 17, 1984 [SE] Sweden .............................. 8400302

[51] Int. Cl.$^4$ .............................................. B01F 3/04
[52] U.S. Cl. .................................... 261/153; 261/103; 261/112
[58] Field of Search ....................... 261/153, 103, 112.2

[56] References Cited

U.S. PATENT DOCUMENTS

| 2,545,028 | 3/1957 | Haldeman | 261/153 |
| 2,782,009 | 2/1957 | Rippingille | 165/166 |
| 2,869,835 | 1/1959 | Butt | 165/166 |
| 3,256,930 | 6/1966 | Norback . | |
| 3,568,462 | 3/1971 | Hoffman et al. | 261/153 |
| 3,995,689 | 12/1976 | Cates | 261/153 |
| 4,002,040 | 1/1977 | Munters et al. | 261/153 |
| 4,099,928 | 7/1978 | Norback . | |

FOREIGN PATENT DOCUMENTS

| 54100 | 1/1938 | Denmark | 261/104 |
| 0086175 | 2/1983 | European Pat. Off. . | |
| 0095510 | 12/1983 | European Pat. Off. . | |
| 2450739 | 4/1976 | Fed. Rep. of Germany . | |
| 2459437 | 1/1981 | France | 261/153 |
| 57-20787 | 12/1982 | Japan . | |
| 57-207795 | 12/1982 | Japan . | |
| 57-207796 | 12/1982 | Japan . | |
| 147573 | 1/1983 | Norway . | |
| 582865 | 12/1976 | Switzerland . | |
| 2093583 | 9/1982 | United Kingdom . | |
| 641260 | 1/1979 | U.S.S.R. | 261/153 |

OTHER PUBLICATIONS

AKA Industriprodukter AB catalog for Produkter pa VVS84–Plattvarme Vaxlare.

*Primary Examiner*—Tim Miles
*Attorney, Agent, or Firm*—Curtis, Morris & Safford

[57] ABSTRACT

A contact body especially for evaporative cooling of a flow of useful air by means of a flow of cooling air. The contact body is built up of layers with slots existing between the layers, which slots are passed by the two air flows separated from each other, the heat exchange being effected through the walls of the layers. The layers comprise panels rigid in shape and composed of plane plates located in parallel adjacent relationship. Arranged between the plane plates are stiffening members provided with flanges and defining the clearance between the plane plates and extending in the direction of flow of the stream of useful air. The panels are composed to a contact body by means of straight, elongated spacer members, which extend in the direction of flow of the stream of cooling air.

9 Claims, 5 Drawing Figures

CONTACT BODY

This application is a continuation of application Ser. No. 698,604, filed Feb. 6, 1985, now abandoned.

The present invention relates to a contact body, for example for heat exchange between two fluids such as two air flows, said contact body being of a multi-layer type with spaces formed therebetween and which are passed by the two fluids separated from each other, the heat exchange being effected through the layer walls.

Contact bodies of said kind are used, for example, for indirect, evaporative heat exchangers, mainly for two air flows, where the one air flow is caused to flow through a group of spaces or slots, while the other air flow is caused to flow in another group of slots, which are separated from the slots which are passed by the first air flow. The air in the two groups of slots flows then usually in cross- or counter-current directions. In known heat exchangers of this kind the slots are formed e.g. by a great number of plane plates being disposed in parallel adjacent one another. A drawback inherent to such heat exchangers is, however, that the plates must be made relatively thick to make sure that they remain plane under the load which is exercised onto the contact body partly through the own weight of the body and partly through the pressure differences to which the material in the plane plates is subjected during operation. However, the thick plates make the manufacature of the contact body expensive and increase the weight thereof, while at the same time the thick plates deteriorate the heat transfer through the layer walls of the contact body.

In order to provide a stiffer contact body which permits use of thinner material which makes the contact body lighter and cheaper and improves the heat transfer, it is known already to use as the layer material undulating folded or corrugated plates which are disposed with the folds or ridges in adjacent layers crossing each other, so called cross-corrugation. This structure becomes highly rigid to its shape due to the feature that the corrugated layers bear against each other at the crossing points. Another advantage obtained with the cross-corrugations is the strongly increased capacity of heat transfer bestowed within the same external dimension of the contact body. However, a disadvantage inherent to this structure is that the average cross-sectional area of all slots is equally great. Therefore, in the dimensioning of the exchanger one will be bound to a predetermined flow passage area, which may cause problems from the viewpoints of pressure fall and efficiency. An essential drawback inherent to these two known structures is, however, that they do not pay regard to the intensity of the flow of energy on both sides of the partition wall between the air flows when evaporation is to be considered in the one air flow. The vaporization heat from the evaporated water is capable of substantially increasing the flow of energy, but such an increase requires a considerable enlargement of the heat transferring surface on the dry side in order to render full effect. Since the surfaces on both sides of the partition wall are equally large, the evaporation in one of the air flows will not render that energy efficiency which should be possible to obtain.

The main object of the present invention is to provide a contact body having such a construction that thin material can be employed so that the contact body can be manufactured at low costs while at the same time the demands for good heat transfer and favourable flow conditions are satisfied. This object is achieved by the contact body according to the invention having received the characteristic features stated in the subsequent claims.

The invention will be described nearer in the following in connection with the attached drawings on which embodiments of contact bodies according to the invention are shown.

The contact body shown in FIG. 1 will be described hereinafter in connection with its use as an indirect, evaporative heat exchanger for exchange of heat between an air flow streaming vertically through the contact body and a useful air flow which is to be cooled and which is supplied to the end portion shown in FIG. 1 and which streams through the contact body in the transverse direction in channels or fluid flow slots which are separated from the slots passed by the vertical air flow.

Figure 2:
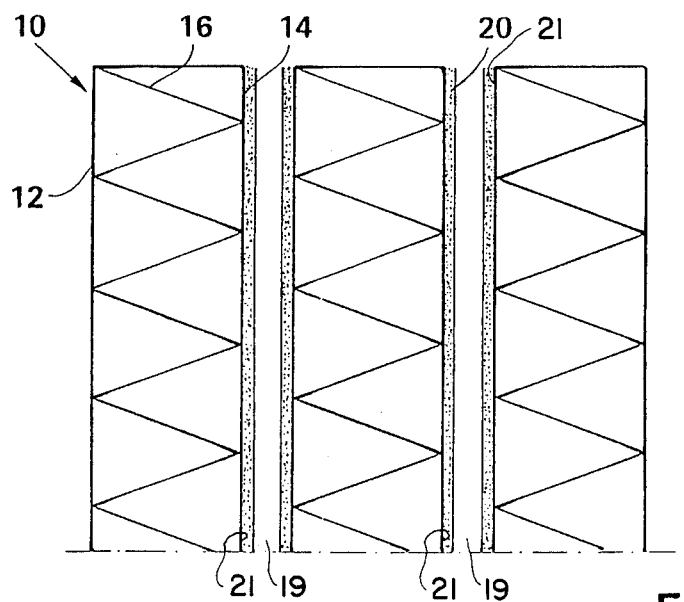
FIG. 2 shows a partial section through the contact body of FIG. 1.

According to the invention, the contact body is composed of a plurality of elements 10 of rigid shape or sandwich type, which, as is evident from FIG. 2, are composed of two plane plates or layers 12, 14 and an interposed stiffening and surface increasing member constituted by an undulating folded or corrugated plate 16. The panels 10 constitute the flow passages for the useful air which is to be cooled in the contact body, and the stiffening members or the corrugated plates 16 are disposed between the plates 12 and 14 with their ridges extending in the flow direction of the air. Thus, the stiffening members or folded plates 16 define the width of the slots in the contact body through which the useful air passes.

The plates 12, 14 and 16 are of a thin material having good heat conducting capacity such as metal, e.g. aluminium, and are joined together by e.g. thermal connection, glueing or some other suitable joining into a sandwich-type element 10, which in itself is rigid to its shape. As is evident from FIG. 1, a desired number of these elements 10 are joined together with a spacing which is determined by spacers 18 disposed between the elements 10. These spacers 18 define at the same time the width of the vertically extending slots 19 in the contact body, through which the cooling air flow passes.

In order to increase the cooling effect, the walls in the slots 19 are wetted in known manner, for which purpose the surfaces of the plates 12, 14 facing the slots 19 are covered by a layer 20 of a water absorbing and/or sucking material. During the passage of the cooling air through the slots 19 an evaporation of water to the cooling air will take place so that an intensive transfer of heat is obtained from the useful air in the passages defined by the plates 12, 14, and 16 to the cooling air in the slots 19, whereby the temperature of the useful air is reduced to a low value. Normally, the walls are kept moistened to the extent only which is required for the evaporation. The slots which are passed by the cooling air can, because of the evaporative cooling effect, be made considerably narrower than the slots which are passed by the useful air, which is rendered possible in a simple manner by the structure according to the invention, where the sandwich elements 10, which define the width of the slots or passages for the useful air, and the spacers 18, which define the width of the slots or passages for the cooling air, can be made with any desired width or breadth independently of each other. Due to the evaporative effect the required quantity of cooling air is normally smaller than the quantity of useful air.

The flanges of the stiffening members or corrugations 16 contained in the sandwich element 10 constitute a larger heat transferring surface which is swept over by the passing flow of useful air, for which reason it is of importance and advantageous to provide as much heat transferring material as possible in the channel for useful air in order to reach the highest heat transfer effect. This can be made by giving the undulating folded portions a little top angle of e.g. 40°. Since in the structure according to the invention a very thin material can be used, such an increase of the heat transferring surface does not result in any exorbitant increase of the weight of, or the costs for, the contact body. Due to the fact that the corrugations 16 extend in the direction of flow of air, the flow conditions also are not affected unfavourably so as to result in an excessive pressure drop. As will be seen in FIG. 2, it is preferred to have the uppermost leg in the last folded portion of the stiffening member 16 positioned so as to extend at right angle towards the plane plates 12, 14 and thereby closing the sandwich element 10 at the top so that a plane surface seals at the top side of the contact body. Preferably, the base portion of the sandwich element is designed in the same manner.

Figure 1:
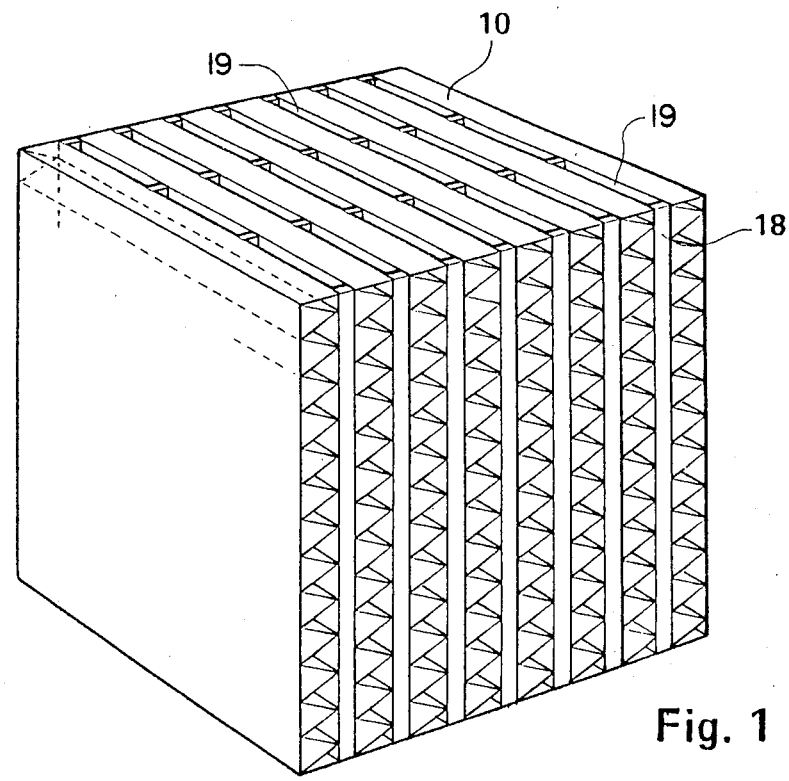
FIG. 1 is a perspective view of such a contact body.
Figure 5:
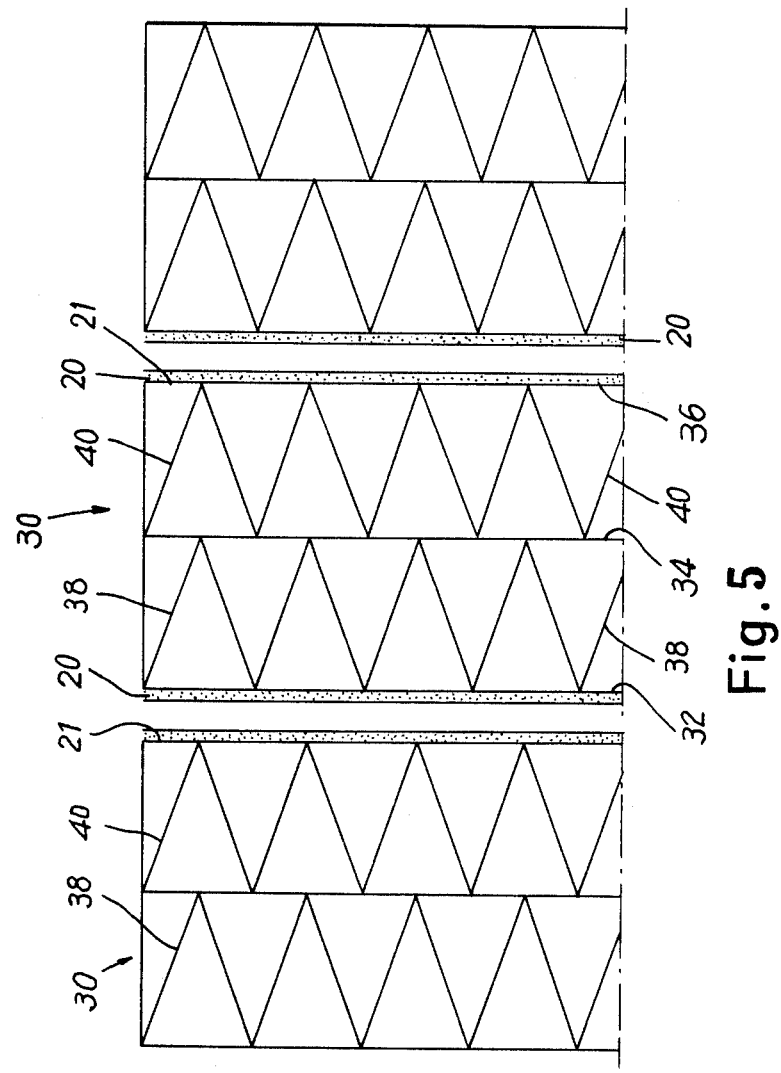
FIG. 5 shows a partial section through another embodiment of a contact body according to the invention.

Even if in the embodiment shown in FIGS. 1 and 2 the rigid panels 10 have been manufactured from two plane plates 12, 14 with an interposed, folded plate, the panels may, of course, be built up from more plane plates or layers 12, 14 with interposed corrugated plates 16, as shown in FIG. 5, in order to increase the width and/or the rigidity of the corrugated portion and thereby the heat transferring surface also.

Figure 3:
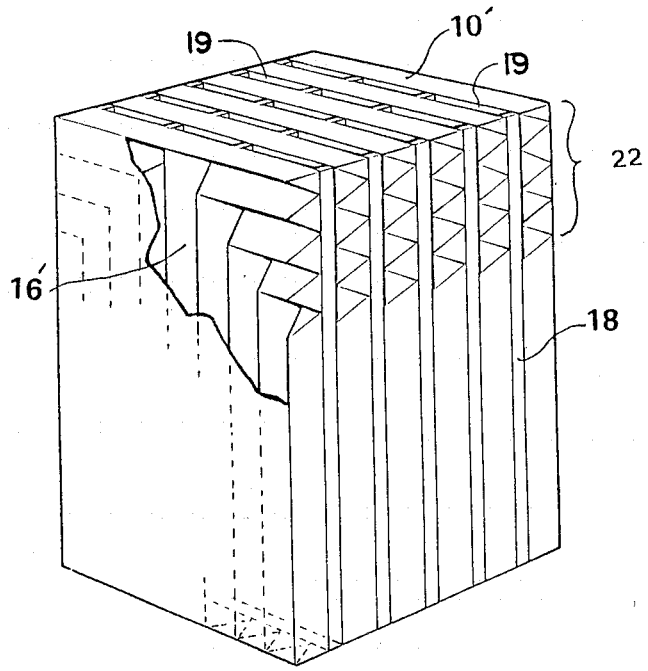
FIG. 3 is a perspective view of a modified embodiment of the contact body.

In the embodiment shown in FIG. 3, the contact body is built up in the same manner as in FIG. 1 with panels or sandwich elements 10' which are joined together with slots therebetween. The magnitude of the slots between the sandwich elements 10' is defined by the spacers 18. An upper portion only of the contact body, which portion is indicated by the reference numeral 22, is used as an inlet for the useful air passing through the heat exchanger. Due to the feature that the folded stiffening members or plates 16' are provided with folds which are angularly deflected in downward direction, i.e., which are L shaped, the useful air enters the contact body in the horizontal direction, and then it is deflected downwardly in the vertical direction. As is evident from FIG. 4, the useful air may be introduced at both front end portions of the contact body.

Figure 4:
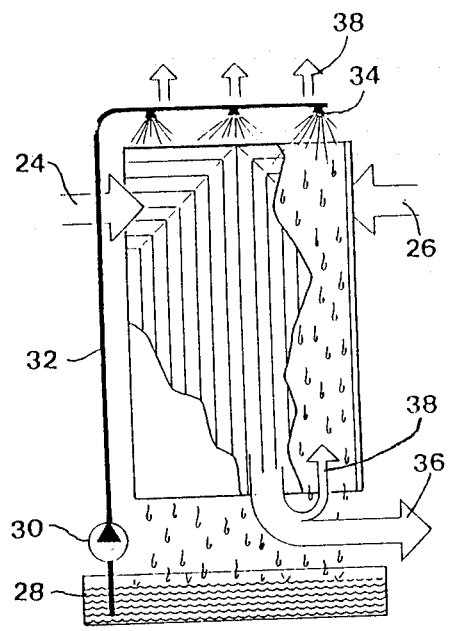
FIG. 4 shows, partly in section, a side view of the contact body according to FIG. 3 in installed condition.

FIG. 4 shows the contact body of FIG. 3 in an installed condition, with the directions of flow for the fluids passing the heat exchanger or contact body marked. FIG. 4 illustrates how the useful air to be cooled is introduced. The useful air to be cooled is introduced at the inlets according to the arrows 24, 26 at both the front end portions of the contact body, and it follows the corrugated portions initially horizontally and subsequently vertically downwardly within the contact body. Water from a collecting trough 28 at the lower end of the contact body is circulated through the body by means of a pump 30 and a tube system 32 with sprayers 34. The water flow is depicted indicated in the right-hand portion of FIG. 4. The water flow is in the form of a thin film. The main portion of the useful air that has passed the contact body is shown by the arrow 36. The main portion of the useful air is separated from the downwardly flowing water, and it exits the contact body toward the right in FIG. 4. Another portion of the useful air, which is shown by the arrow 38, is deflected upwardly. This portion becomes the cooling air.

As is evident from the preceding description, the invention entails a number of advantages when compared with known contact bodies. The structure composed of sandwich elements or panels 10, 10' of thin material which are rigid in shape, results in a cheap and simple construction, while at the same time the folded or corrugated stiffening members or plates 16, 16' afford a large heat transfer surface, where the folded plate forms flanges and most suitably is made of a material possessing good heat conductivity, such as metal. Within a predetermined external dimension the slots for the useful air can be given a width which is well adapted to velocities and pressure falls of the air, whereas by means of the jointing technique with the spacers 18 the slots 19 for the cooling air can be kept as narrow as possible without any bridging occurring between the two opposite sides of the slots. The slots for the useful air which contain the undulating folded plates 16, 16' thus have a width preferably within the range of 3 to 20 mm, especially between 5 and 10 mm, whereas the slots for the cooling air have a width of $\frac{1}{8}$ to $\frac{2}{3}$ or possibly slightly more of the width of the slots for the useful air, but in any case more than 2.5 mm. The soaking layer 20 has a thickness within the range from 0.1 to 0.25 mm, and between the layer 20 and the plane plates 12, 14 a layer 21 protecting against corrosion, such as a film of a plastic material, may be arranged, preferably a polyethylene film having a thickness of about $50\mu$. The thickness of the sheets or plates 12, 14, 16 is kept within the range from 0.005 to 0.25 mm, especially for sheets of metal, such as aluminium.

As will be understood from the aforesaid, the novel contact body combines the advantages inherent to previously known constructions with plane or folded layers while at the same time eliminating the drawbacks described in the introductory part above.

Otherwise, the invention is not limited to the shown embodiments, but may be varied in the widest sense within the scope of the basic idea thereof. Thus, as mentioned, the sandwich elements or panels 10, 10' may be formed with more plane plates or layers with interposed corrugated members, as shown in FIG. 5. Specifically, FIG. 5 illustrates a plurality of sandwich elements 30. Each sandwich element 30 includes three plane plates 32, 34, and 36 and two interposed stiffening members 38 and 40. Water absorbing layers 20 cover the exterior surfaces of the plates 32 and 36, and protective layers 21 are located between the water absorbing layers 20 and the plates 32 and 36.

I claim:

1. A contact body for indirect evaporative cooling of a first airstream of useful air by means of a second airstream of cooling air, comprising:
   a plurality of panels, each panel including a pair of planar, substantially parallel plates made of a first heat conductive material and a corrugated plate made of a second heat conductive material, each of the planar plates having an outside wall and an inside wall, the corrugated plate having a plurality of corrugations, the tips of the corrugations being in heat conductive contact with the inside walls of said planar plates, said planar plates and said corrugated plate defining a plurality of flow passages for the useful airstream; each panel further including a moisture-impervious layer convering each wall of said planar plates and a moisture-absorbing layer covering each of the moisture-impervious layers; a plurality of spacers;

wherein at least two spacers are positioned between and separate two of said panels, said at least two spacers contacting the moisture-absorbing layers of said two panels, said at least two spacers and said two panels defining at least one flow passage for the cooling airstream; and wherein the width of said plurality of flow passages for the useful airstream is greater than the width of said at least one flow passage for the cooling airstream; whereby the width of said plurality of flow passages for the useful airstream and the width of said at least one flow passage for the cooling airstream may be varied independently of one another by varying the width of said corrugated plate and the width of said spacers, respectively; and wherein each panel includes at least three planar, substantially parallel plates made of the first heat conductive material and at least two corrugated plates made of the second heat conductive material, each of the planar plates having two walls, each of the corrugated plates having a plurality of corrugations, the tips of the corrugations of each corrugated plate being in heat conductive contact with opposed walls of the associated pair of planar plates; and wherein the moisture-impervious layers and the moisture-absorbing layers are located on the planar plate walls not contacting the corrugated plates.

2. A contact body as recited in claim 1, wherein the width of said plurality of flow passages for the useful airstream is between about 3 millimeters and about 20 millimeters and wherein the width of said at least one flow passage for the cooling airstream is between about $\frac{1}{3}$ and about $\frac{2}{3}$ of the width of said plurality of flow passages for the useful airstream.

3. A contact body as recited in claim 2, wherein the width of said at least one flow passage for the cooling airstream is at least 2.5 millimeters.

4. A contact body as recited in claim 2, wherein the width of said plurality of flow passages for the useful airstream is between about 5 millimeters and about 10 millimeters.

5. A contact body as recited in claim 1, wherein said corrugated plate is a folded plate with the angle between adjacent folds being between about 35 degrees and about 45 degrees.

6. A contact body as recited in claim 5, wherein the angle between adjacent folds is approximately 40 degrees.

7. A contact body as recited in claim 1, wherein said corrugated plate has L-shaped corrugations.

8. A contact body as recited in claim 7, wherein said L-shaped corrugations form two inlets on opposite sides of said panel, said inlets being located along an upper portion of said panel, said contact body further comprising means for feeding water to said at least one flow passage for the cooling airstream and means located at the bottom of said contact body for deflecting the cooling airstream into said at least one flow passage for the cooling airstream.

9. A contact body as recited in claim 1, wherein each moisture-impervious layer is a polyethylene film with a thickness of approximately 50 micrometers.

* * * * *